United States Patent [19]
Fox

[11] 3,735,346
[45] May 22, 1973

[54] SECURITY SYSTEM FOR A VEHICLE

[76] Inventor: Ralph W. Fox, 116 Hallett Avenue, Port Jefferson, N.Y.

[22] Filed: Sept. 23, 1970

[21] Appl. No.: 74,728

[52] U.S. Cl. ..................340/63, 340/53, 180/114
[51] Int. Cl. ........................................B60r 25/10
[58] Field of Search..............340/63, 64, 65, 53, 340/274, 276, 278, 309.1, 309.4; 180/114

[56] References Cited

UNITED STATES PATENTS

| | | | |
|---|---|---|---|
| 3,639,897 | 2/1972 | Teich | 340/64 |
| 3,174,502 | 3/1965 | Howarth et al. | 180/114 UX |
| 2,935,730 | 5/1960 | Procter | 340/63 |
| 3,281,785 | 10/1966 | Oursler | 340/63 |

*Primary Examiner*—Alvin H. Waring
*Attorney*—Evelyn M. Sommer

[57] ABSTRACT

A security system for a vehicle in which the opening of any sealed door establishes an alert signal that is applied to a time delay controller that operates a pair of disabler devices to halt the vehicle at a preselected time interval after initiation of the alert signal. One disabler device shuts off fuel to the vehicle propulsion engine and the other disabler device activates the vehicle brakes.

5 Claims, 1 Drawing Figure

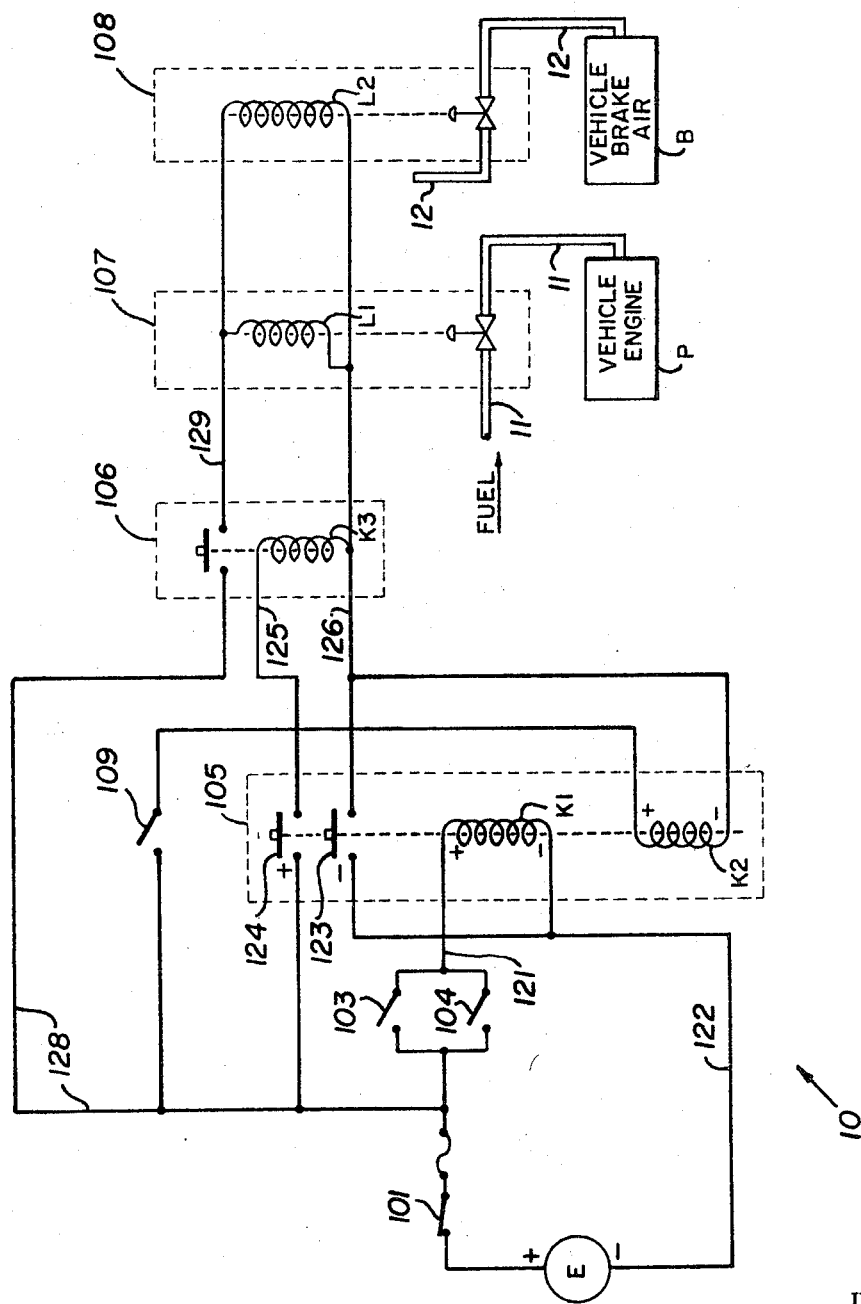

SECURITY SYSTEM FOR A VEHICLE

BACKGROUND AND SUMMARY OF THE INVENTION

The present invention relates in general to security systems for motor vehicles and more particularly to a security system designed to prevent thefts and hijacking of trucks and other cargo carrier vehicles.

There is an urgent need for an on-board security system that is capable of preventing the successful completion of a truck hijacking without endangering the driver and without being in any way under the control of the driver. In many typical truck hijackings, the hijacker enters the driver's cab at the point of interception, removes the driver and then the truck is driven by the hijacker to a rendezvous for unloading of cargo. Accordingly, the opening of any cab door at any time after the truck has embarked on a non-stop haul and before it arrives at its intended destination can be regarded as the occurrence of a security hazard event.

The design of the vehicle security system of the invention is formulated upon the basis that the opening of a cab door, or any sealed door of the vehicle constitutes a security hazard event that must be counteracted by automatically disabling the vehicle to the extent that is movement is positively halted and cannot be resumed until release action is taken by someone brought to the stop location.

To minimize danger to the driver, the invention provides means for delaying disablement of the vehicle until a predetermined time has elapsed since the occurrence of the door-opening event. This time delay can be made selectable and is in the order of about 15 minutes, so as to allow the hijackers to drive away from the interception point for some distance before they are stopped, which in many cases will result in a safe separation of the driver from the hijackers.

The door-opening event is sensed by one or more switches that are activated thereby to establish an alert signal that is applied to a time delay controller. The time delay controller in turn establishes a command signal at the given time delay after occurrence of the alert signal event. This command signal operates a plurality of disabler devices each effecting a distinct, but nondamaging, disablement upon the vehicle, any one disablement being sufficient to halt the vehicle.

According to a preferred embodiment of the invention, there are provided a pair of disabler devices, one of which is a solenoid valve that operates to shut-off the fuel feed to the propulsion engine of the vehicle, and the other disabler device is a solenoid valve that activates the vehicle brakes by releasing pressurized air or other brake operating fluid. Most heavy trucks and trailer combinations have air braking systems in which the wheel brakes are held in a released state by pressurized air and should this air pressurization be lost, as when intentionally braking the vehicle, the brakes are automatically activated by compressed springs to halt the vehicle. Consequently, with such combination of disabler devices, the hijacked vehicle cannot be driven after fuel shut-off, nor can it be towed because its brakes are locked. When the proper security systems unlocking switch key is brought to the vehicle, the two disabler valves are easily reset to restore the vehicle to a normal mobility condition, neither disablement resulting in any permanent damage.

For a better understanding of the invention, its uses and advantages, reference should be had to the accompanying drawing and following detailed description of a preferred embodiment of the invention.

BRIEF DESCRIPTION OF THE DRAWING

In the drawing there is illustrated schematically a vehicle security system according to a preferred embodiment of the invention, which system is shown in a state of readiness.

DESCRIPTION OF A PREFERRED EMBODIMENT OF THE INVENTION

In the drawing there is exemplified a security system 10 for a vehicle (not shown) having a propulsion engine P fed with fuel through a line 11, and equipped with an air braking system B in which release of pressurized air through a vent line 12 results in operation of all wheel brake units (not shown) to halt the vehicle. Engine P and air brakes B can be of any conventional prior art types that should be well known to the artisan.

Security system 10 includes an electric source that is expediently a battery E, a key-controlled master switch 101 that is normally closed when system 10 is in readiness, sensor switches 103, 104, a latching relay 105, a time delay relay 106, solenoid valves 107, 108 and a switch 109 used for resetting latching relay 105.

The switches 103, 104 are disposed each one for activation by the opening of a corresponding vehicle cab door (not shown) and are normally open with system 10 set in readiness by closure of switch 101, which is done after the vehicle occupants are in place within the cab and ready to start on a delivery trip, subject to the operating rule that neither of the two cab doors are to be voluntarily opened at any time during the trip before arrival at the destination. Under such rule, opening of any one or both sealed doors monitored by sensor switches 103, 104 will result in the application of an alert signal being applied to the operate coil K1 of relay 105. This alert signal is in the form of an energizing current from battery E which is passed through coil K1 via the signal transmission line defined by the pair of conductors 121 and 122, the positive terminal of battery E being connected to coil K1 through switch 101 in series with switch 103 and/or switch 104, and conductor 121, and the negative terminal of battery E being connected to coil K1 through conductor 122.

Activation of relay 105 by the alert signal occurs substantially simultaneously upon occurrence of the door-opening event and results in the closure of switch contacts 123 and 124 of relay 105. The relay 105 is of the latching type in which the armature is mechanically latched to maintain contacts 123, 124 closed, even though energization of the operate coil K1 is subsequently terminated, as for example the opened door is closed and its switch 103, 104 is restored to the normally open state. For resetting relay 105 there is provided as part thereof a reset coil K2 which when energized by closing the normally open switch 109, unlatches the armature to restore contacts 123, 124 to their open circuit states. Consequently, once the alert signal occurs, and until switch 109 closes, the conductors 125 and 126 are effectively connected to the positive and negative terminals respectively of battery E to energize the coil K3 of time delay relay 106.

The switch contacts 127 of relay 106 are connected to the positive terminal of battery E through conductor 128 and switch 101, and are connected to the operating coils L1, L2 of solenoid valves 107, 108, respectively, by a conductor 129 so that both valves 107, 108 are activated by the closure of contacts 127 which occurs at a predetermined time delay after occurrence of the door-opening event manifested by the alert signal. The amount of time delay is a characteristic of relay 106 itself and is expediently in the order of about fifteen minutes. There are many varieties of commercially available time delay relays, including those in which the delay time adjustable, and the choice of a particular time delay relay 106 is left to the artisan.

At the end of the prescribed time delay, relay 106 contacts 127 close to establish a command signal in the form of a current flowing in conductor 129 and through both valve coils L1, L2 thereby concurrently activating valves 107 and 108.

Valve 107 is normally open and is installed in series with the fuel supply line 11 such that activation of valve 107 shuts off the fuel feed to engine P, thereby halting the vehicle and disabling its capability for self-propulsion.

Valve 108 is normally closed and is installed in the air vent line 12 such that activation of valve 108 releases the pressurized air in the braking system B, thereby allowing the brake springs thereof (not shown) to automatically activate all wheel brakes to halt the vehicle and hold it in a brakes-locked condition so that it cannot be towed.

The foregoing description of a preferred embodiment of the invention is presented for the purpose of exemplifying how the invention can be constructed and operated using commonly available relays, switches and other components. It is recognized that, if desired, the artisan can substitute well known equivalent solid-state electronic circuits for many of the components and combinations thereof detailed herein, and that such substitutions are contemplated by the invention.

In essence, the security system 10 of the invention is predicated as one for use on board a vehicle equipped with a fuel-fed propulsion engine and a braking system that can be conveniently set into a brakes-locked state.

System 10 itself can be regarded generally as the combination of a sensor means, a control means, and at least one vehicle disabler. In the example presented herein, the sensor means includes the door monitoring switches 103, 104, but in general the sensor means can be constituted by any device or combination of devices capable of sensing the occurrence of a security hazard event of the type that is to be counteracted by disabling the vehicle to be protected. In response to such event, the sensor means must establish an alert signal in a form to which the control means can respond by establishing a command signal at a given time delay after the event indicated by the alert signal. Each vehicle disabler means is coupled to the control means for control thereby and is operable to effect a predetermined disablement of the vehicle in response to the establishment of the command signal.

In system 10, the cooperating relays 105 and 106 can be regarded as defining a time delay controller, relay 105 being activated directly by the alert signal of the sensor means switches 103, 104, and relay 106 being activated by relay 105.

The command signal resulting from operation of time delay relay 106 is also the energizing current or voltage applied to the vehicle disabler valve coils L1, L2, and is of the same character as the alert signal to permit the expediency of using a single, common battery E for operating all components of system 10.

What is claimed is:

1. A security system for a vehicle having a fuel-fed propulsion means and a braking means which comprises a sensor means disposed to sense the opening of any sealed door of the vehicle, said door opening constituting the occurrence of a security hazard event to be counteracted by disabling the vehicles, said sensor including at least one main switch connected to an electric source, and operable to establish an alert signal upon the occurrence of such event; a signal transmission line connected to said main switch; means connected to said transmission line responsive to said alert signal for establishing a command signal; at least one vehicle disabler means coupled to said command means operable to effect a predetermined disablement of the vehicle in response to the establishment of said command signal and control means interposed in said transmission line between said switch and said command means, said control means includes a latching relay comprising an armature and a pair of activating coils, one of said coils being connected to said transmission line to cause said armature to move in a first direction on closing of said switch, the other of said coils being connected directly to said electric source and being provided with switch means to cause said armature to move in a direction opposite to said first direction, armature being adapted to close a set of contacts to said command means on movement in said first direction and to open said set of contacts on movement in said opposite direction, and a time delay relay interposed between the armature contacts and said command signal means to delay the transmission of an alert signal from said main switch to said command signal means.

2. A security system according to claim 1 wherein said vehicle disabler means includes a valve operable in response to said command signal to interrupt the feeding of fuel to the vehicle propulsion means.

3. A security system according to claim 1 wherein said vehicle disabler means includes a valve coupled to the braking means of the vehicle and operable in response to said command signal to activate said braking means and thereby halt the vehicle.

4. A security system according to claim 1 including a plurality of vehicle disabler means coupled to said control means for simultaneous control thereby, one of said disabler means including a valve operable in response to said command signal to interrupt the feeding of fuel to the vehicle propulsion means, another of said disabler means including a valve coupled to the braking means of the vehicle and operable in response to said command signal to activate said braking means, whereby upon establishment of the command signal a plurality of distinct disablements are effected upon the vehicle, any one disablement being sufficient to halt the vehicle.

5. A security system according to claim 1 wherein said predetermined disablement of the vehicle occurs while the vehicle is in motion.

* * * * *